US008280896B2

(12) United States Patent
Chapé et al.

(10) Patent No.: US 8,280,896 B2
(45) Date of Patent: Oct. 2, 2012

(54) REPORTING ROW STRUCTURE FOR GENERATING REPORTS USING FOCUS AREAS

(75) Inventors: Xavier Chapé, Sentløse (DK); Kyrylo Val, Copenhagen (DK); Oleksandr Nazarov, Kokkedal (DK); Mark Brantbjerg Madsen, Copenhagen (DK); Christian Honore, Copenhagen (DK)

(73) Assignee: Microsoft Corporation, Redmond, WA (US)

( * ) Notice: Subject to any disclaimer, the term of this patent is extended or adjusted under 35 U.S.C. 154(b) by 1236 days.

(21) Appl. No.: 11/298,933

(22) Filed: Dec. 9, 2005

(65) Prior Publication Data
US 2007/0136352 A1  Jun. 14, 2007

(51) Int. Cl.
*G06F 7/00* (2006.01)
(52) U.S. Cl. ....................................................... 707/754
(58) Field of Classification Search ........................ None
See application file for complete search history.

(56) References Cited

U.S. PATENT DOCUMENTS

| | | | | | |
|---|---|---|---|---|---|
| 5,241,645 | A | * | 8/1993 | Cimral et al. | 703/2 |
| 5,396,621 | A | * | 3/1995 | MacGregor et al. | 715/809 |
| 5,502,805 | A | * | 3/1996 | Anderson et al. | 715/209 |
| 5,632,009 | A | * | 5/1997 | Rao et al. | 715/201 |
| 5,664,127 | A | * | 9/1997 | Anderson et al. | 715/776 |
| 5,880,742 | A | * | 3/1999 | Rao et al. | 345/440 |
| 5,926,820 | A | * | 7/1999 | Agrawal et al. | 1/1 |
| 6,085,202 | A | * | 7/2000 | Rao et al. | 715/201 |
| 6,698,013 | B1 | * | 2/2004 | Bertero et al. | 717/127 |
| 6,996,569 | B1 | * | 2/2006 | Bedell et al. | 707/737 |
| 7,146,379 | B2 | * | 12/2006 | Anson | 707/754 |
| 7,379,908 | B2 | * | 5/2008 | Clancey et al. | 705/35 |
| 7,383,516 | B2 | * | 6/2008 | Sauls et al. | 715/854 |
| 7,480,662 | B2 | * | 1/2009 | Potapov et al. | 1/1 |
| 7,761,457 | B2 | * | 7/2010 | Error et al. | 707/754 |
| 2002/0055952 | A1 | * | 5/2002 | Clancey et al. | 707/504 |
| 2003/0061193 | A1 | * | 3/2003 | Anson | 707/1 |
| 2004/0111672 | A1 | * | 6/2004 | Bowman et al. | 715/513 |
| 2005/0004936 | A1 | * | 1/2005 | Potapov et al. | 707/103 R |
| 2005/0076045 | A1 | * | 4/2005 | Stenslet et al. | 707/101 |
| 2005/0267910 | A1 | * | 12/2005 | Anson | 707/102 |
| 2006/0235857 | A1 | * | 10/2006 | Sauls et al. | 707/100 |
| 2007/0050323 | A1 | * | 3/2007 | Dettinger et al. | 707/1 |

OTHER PUBLICATIONS

Richard Holowczak, "Microsoft Access Tutorial".*
Holowczak, Microsoft Access Tutorial, accessed at http://cisnet.baruch.cuny.edu/holowczak/classes/2200/access/access1.html, bearing a date of Aug. 2000, 48 pages.

* cited by examiner

*Primary Examiner* — Hung Q Pham
*Assistant Examiner* — Hubert Cheung
(74) *Attorney, Agent, or Firm* — Westman, Champlin & Kelly, P.A.

(57) ABSTRACT

A method and an apparatus for generating reports and other outputs from a computer program. A user first defines a focus area, composed of chosen data types and then creates a row definition for the focus area. In defining the row definition the user defines groups and subgroups from the data represented by the focus. This definition process allows the user to generate reports from data organized in similar rows. The user has the ability to define the data to be included in the report through the use of an expression. The expression can also be used to exclude data from the report. Additional embodiments allow the user to verify the use of data and if the data has been used multiple times, and to capture on the output the missings and duplicates.

20 Claims, 6 Drawing Sheets

REPORTING ROW STRUCTURE FOR GENERATING REPORTS USING FOCUS AREAS

BACKGROUND

Many computer programs use databases to store information used in an organization. These databases are often arranged in logical formats so that users can identify or use information easily. One common format for presenting data to user is to present related information in the form of rows and columns in a table or other spreadsheet. When using a row structure similar data is presented in the same row or column. One example of a computer program that makes use of this type of data presentation is an enterprise resource programs (ERP). ERPs provide numerous ways for organizations to manage their day to day operations. Depending on the needs of the corporation the ERP may include a number of modules and databases that meet the corporation's needs. These databases often include information used to manage client contacts, manage inventory, generate accounts, generate invoices, as well as many other functions.

Currently, when a user of an ERP wishes to generate a limited report from within one of the modules the user must individual select each record desired to be reported out. For example, in certain software programs there is a desire to generate financial statements and maintain Generally Accepted Accounting Principles (GAAP) and eXtensible Business Reporting Language (XBRL) compatibility. To achieve this is it currently necessary to compile financial transaction figures on ledger accounts that are organized per line items.

Further, it has been desired to allow production of multi-financial dimensions analysis. This requires compiling financial figures on single or multiple financial dimensions so that they reflect the company's organization, line business or policy. However, in order to achieve this level of functionality it is currently necessary to select each record individually in the related program or programs. This results in a time consuming process to generate the desired reports.

SUMMARY

This Summary is provided to introduce concepts in a simplified form that are further described below in the Detailed Description. This Summary is not intended to identify key features or essential features of the claimed subject matter, nor is it intended for use as an aid in determining the scope of the claimed subject matter.

Embodiments provide a method and an apparatus for generating reports and other outputs from a computer program such as an enterprise resource program. The user first defines a focus area, as a composite of data elements and then creates a row definition for the focus area. In defining the row definition the user organizes and structures the data represented by the focus. This definition process allows the user to generate reports from data organized in similar rows.

The definition of the rows is accomplished in some embodiments by the user dragging and dropping the data that is to be reported out. In other embodiments the user defines the data that is to be reported out through and expression. In other embodiments the user defines data that is to be excluded. This is accomplished in some embodiments through the use of expressions. For example, the user can define the expression to report out all customer accounts beginning with the letter "P" but excluding those accounts ending in the number "1". This way the user is able to customize the reporting structure without having to individually select each record to be reported out or excluded from the report. Further, users can in some embodiments combine and amend a row definition having a different focus.

Other embodiments allow for the user to verify if the data to be reported out is correct and is not overused. Through an exception report the user is able to understand where in the report records are used more than once. This allows users to remove redundant records.

BRIEF DESCRIPTION OF THE DRAWINGS

FIGS. 3-1 and 3-2 are exemplary graphical user interfaces for indicating a focus.

DETAILED DESCRIPTION

Figure 1:
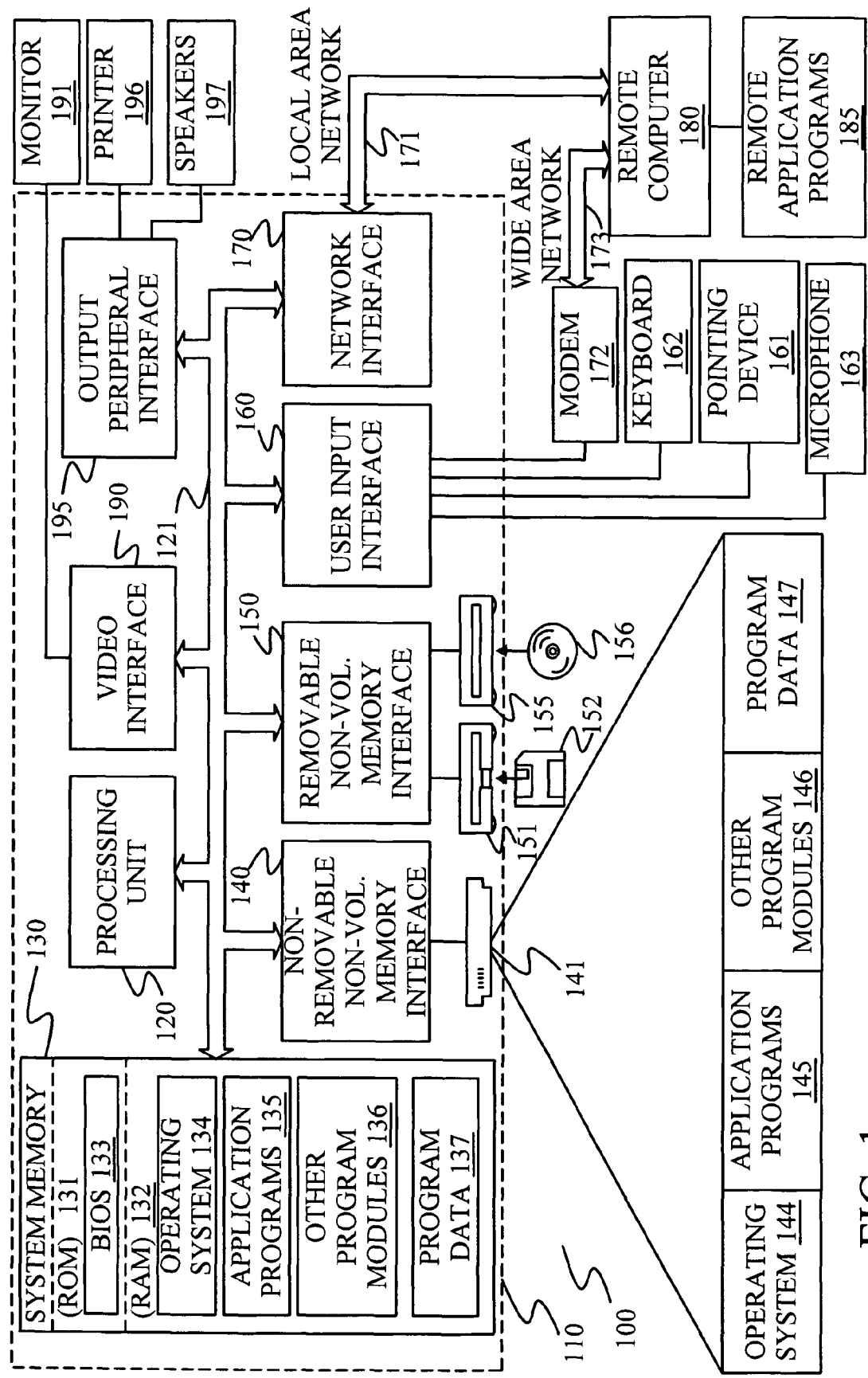
FIG. 1 is a block diagram of one computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

The above description provides an exemplary environment in which the following embodiments can be executed. However, those skilled in the art will readily recognize that these embodiments can be performed on other platforms and environments. In many computer programs there is a desire to compose, organize and structure the presentation of aggregated compiled figures related to selected topics. The desire has been noted, for example, in enterprise resource programs (ERP) systems in order to meet the demand for analysis reports reflecting the company specificities in terms of organization, business and policies so the analysis output is easy to interpret and exploit, without need for re-processing the data afterward. For example, the company may desire to present financial data compiled per department and cost centers according to the company organization, geographical location, etc. This requires on one hand to show a detailed composition on given topics values, while on the other hand showing an aggregated value on other topics values or levels. For example, one current application requires a significant amount of manual and cumbersome manipulation by the user to retrieve a crude pivot table based on the basic topics and re-organize it to combine and structure the topic significantly, and this only partially covers the needs of the company. Other applications have similar problems.

The embodiments discussed below provide many features that address this and other issues. Embodiments allow users to build row structures on any topics and/or combination of topics without limitation. This row structure can be used indifferently of the nature of compiled figures to be reported on. Embodiments also introduce "fictive" intermediate grouping, either to serve as building blocks for intermediate groups or to produce a header and/or a subtotal row that presented the aggregated values of the selected group for any topics, values or combination of values and/or fictive group. Embodiments allow easy mapping of given topic values in the structure. Further embodiments provide means to create dynamical and generic statements for expressing lists of topics components values. For instance, all departments starting with a P and all cost centers but not those ending with 1. Embodiments allow the introduction of calculations between rows which can be also used upon aggregating the level's value, as well as to allow the use of any row as an operand. Embodiments also enable the re-use or the appending of an existing row structure in another row structure upon building, or at the last minute upon run time to show the detailed composition of the main focus figures.

Thus the embodiments discussed below provide a facility that allow users to build intuitively multi-level aggregation reports through branches defining; the intermediate levels of aggregation and or calculation, the topics' values source of the figures to aggregate through branch, and the formatting.

Figure 2:
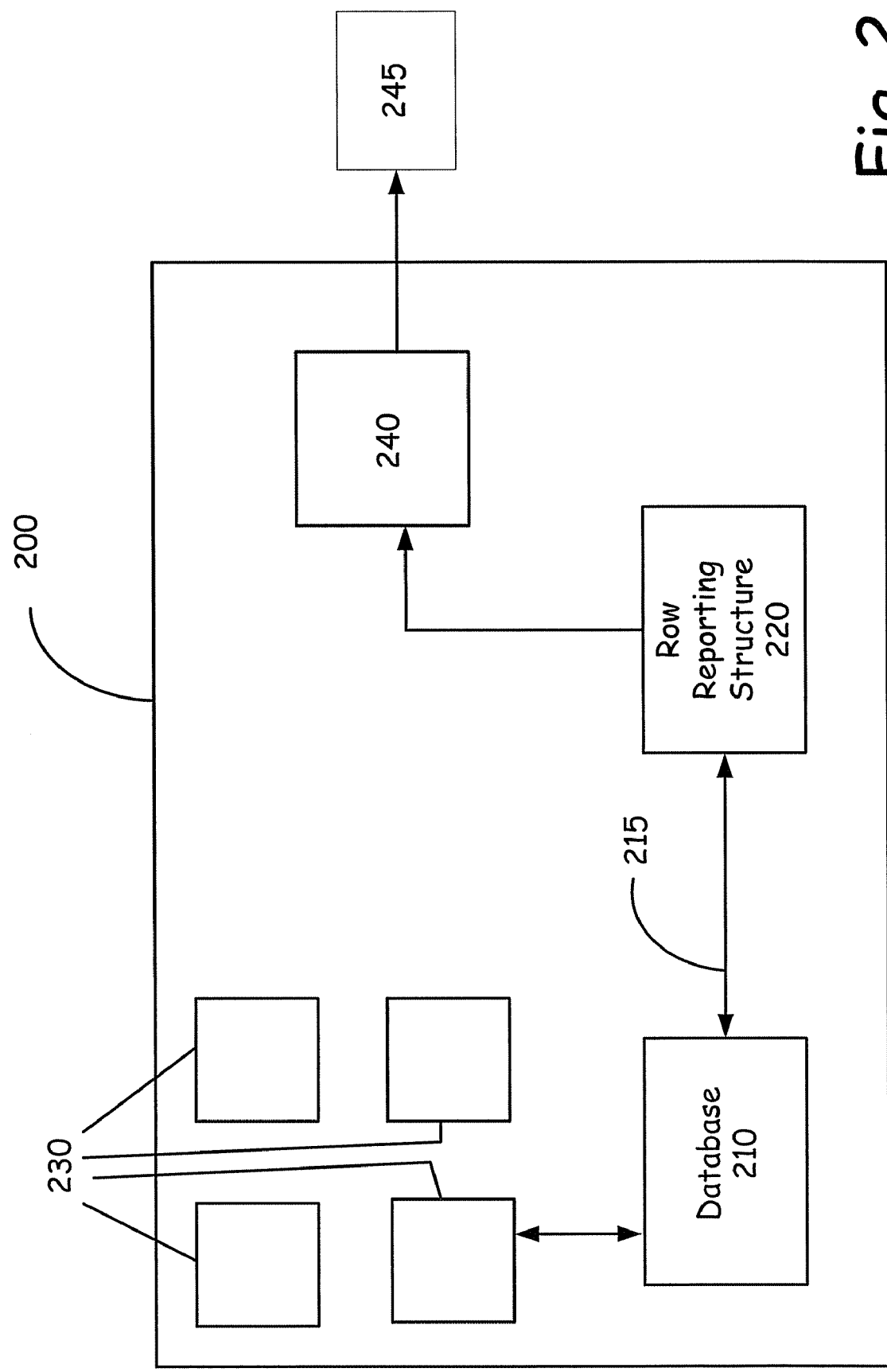
FIG. 2 is a block diagram illustrating the components of an enterprise resource planning program according to one exemplary embodiment.

FIG. 2 is a block diagram illustrating the components of an enterprise resource planning program 200 (ERP) according to one exemplary embodiment. While the discussion below relates to an ERP, the various features of the embodiments are not limited to the discussed ERP, or ERPs in general, but may be used on a wide variety of other programs. Program 200 includes a database 210, a row reporting structure component 220, a set of modules 230, and an output generator 240.

The set of modules 230 provide the basic functionality of the desired program. For example, the modules can provide coding to generate invoices, mailings, accounts receivable, customer lists or any other function that is desired by the user. To generate these functions the set of modules 230 usually interfaces with database 210. Database 210 is in one embodiment a Sequential Query Language (SQL) database. However, any other database formats can be used including both proprietary and non-proprietary database formats. Database 210 contains information that is useful to the user. Typically, this information is stored in the database as records. In some embodiments the records are arranged in rows and columns. However, other methods can be used. These records can be stored using any known method.

Output generator 240 is a component of program 200 that formats the desired output to the correct format. Basically, output generator 240 converts data from either modules 230 or row reporting structure component 220 into a format to display on a display, print to a printer, or output to any output device. The output is shown as block 245.

Line 215 represents a process whereby the program 200 builds an extract for the database 210. In one embodiment this can be a pivot table. However, other formats can be used. Row reporting structure component 220 enables users to build reporting row structures on any type and number of "topics". By topics it generally means data that would generally appear in a column or row on a spreadsheet application. This is because the row structure can be based/build on any focus. The "Focus" is the ability for the user to define the data source fields and their order to be considered. The focus is used to help determine what information is to be outputted from the row structure reporting component 220. In some embodiments the output is compiled figures or values related to the data of focus. In other embodiments the output can merely be the selected data. However, other outputs can be generated.

Figures 1, 3:
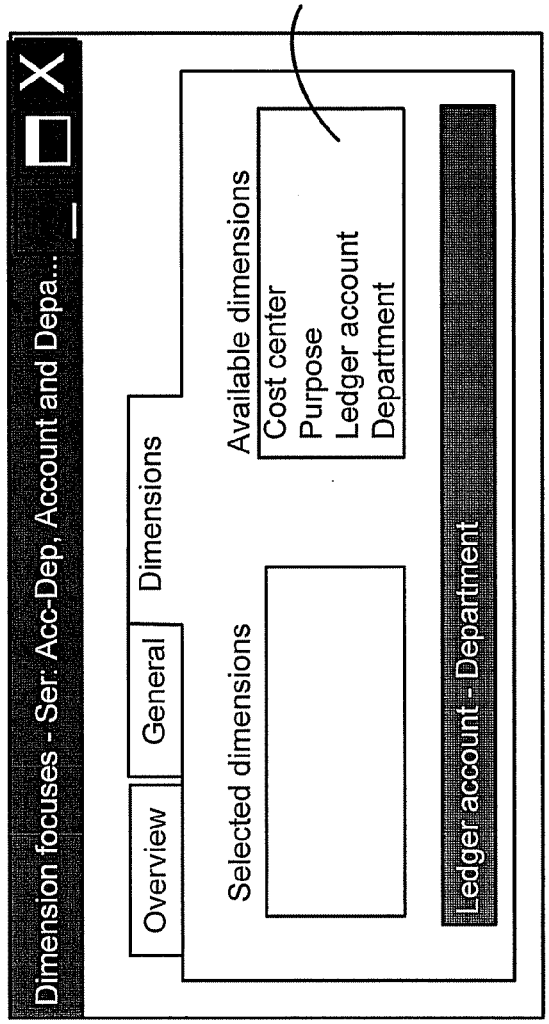
Figures 2, 3:
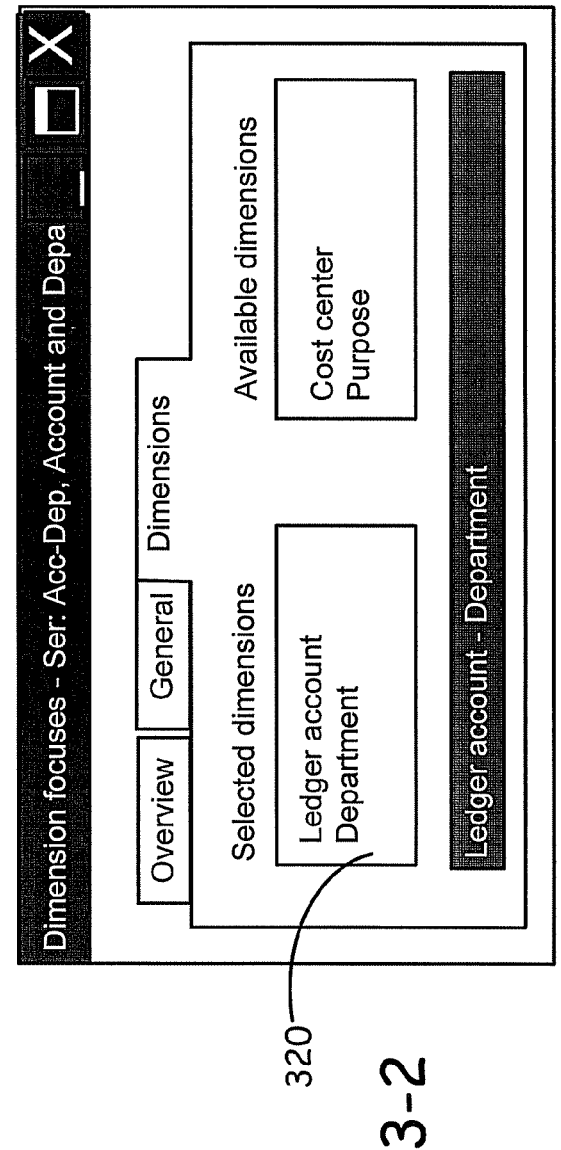

An example of a graphical user interface 300 for selecting the focus is illustrated in FIGS. 3-1 and 3-2. FIG. 3-1 illustrates the interface 300 prior to selecting dimensions, and FIG. 3-2 illustrated the interface 300 after the selection of the dimension. At element 310 the user is presented with the available dimensions of the database from which to choose the focus. The user can select the dimensions that are desired by highlighting or otherwise selecting the dimensions. The selected dimensions are then displayed in area 320.

Once the focus has been defined the user can build a multilevel row structure or row definition. This row structure can be called up along column definitions to produce an output of aggregated data for the desired report type. During this building process the user can insert branches related to groupings, row calculations, focus component value or series of values through element type rows, and substructure type rows. These branches are discussed in greater detail below.

Further, in some embodiments, it is possible to append already defined row definitions. This ability to append can be further extended to multiple foci and row definitions. This allows the user the ability to explore data at different levels of granulation without having to recreate already existing row definitions.

Group type rows allow for the presentation of a header, prior to any substructures, and subtotal at the end of each related substructure. The subtotal in this discussion, as related to financial management programs is a number. However in other programs the subtotal can be other values such as strings, charts, or any other intermediate value that is useful by the user or organization. This subtotal is the sum of the values on the direct sublevel values. This is also known as the row calculation.

Figure 4:
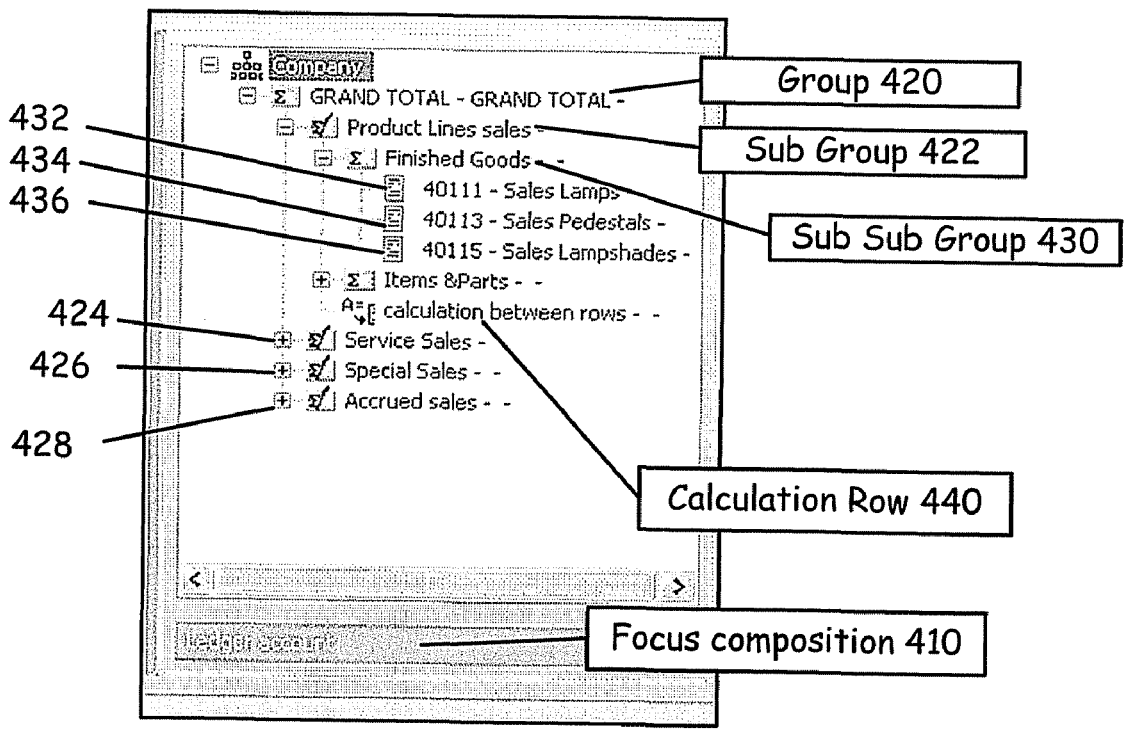
FIG. 4 illustrates an exemplary display of a grouping process.

FIG. 4 illustrates an exemplary display of a grouping process according to one embodiment. In this example, the focus is for a ledger account and is indicated by element 410. The user has created as group 420 a grand total group. The grand total group 420 is further divided into subgroups 422, 424, 426, 428. Subgroup 422 is divided into sub-subgroup 430. This sub-subgroup 430 is included into focus values 432, 434, and 436. It should be noted that these values are illustrative only, and that other values and numbers of groups, subgroups, etc. can be used. Calculation row 440 is an entry in the row definition that defines the output of the focus elements associated with items and ports. In some embodiments, when exploded calculation row 440 displays the elements used in the calculation.

As discussed above, the user can map the different focus component values in the structure. Through the use of an element type row, the user can either by drag and drop or by selecting value or an expression for a series of values of a focus component, map the values to the row definition. The only constraint on the focus components values, is the order of the components. This order was defined by the focus. At this time the user can also select the expression of values that are chosen.

The element type row can, in some embodiments, be an expression which returns a series of values. For instance, all cost center items starting with P or accounts starting with 401. The element type row, in some embodiments, may contain filter criteria and conditions for conditioning the compiled values which are produced during the output process. For example, only print the values for the row if the balance is debit, or else print the balance as per beginning of period.

Figure 5:
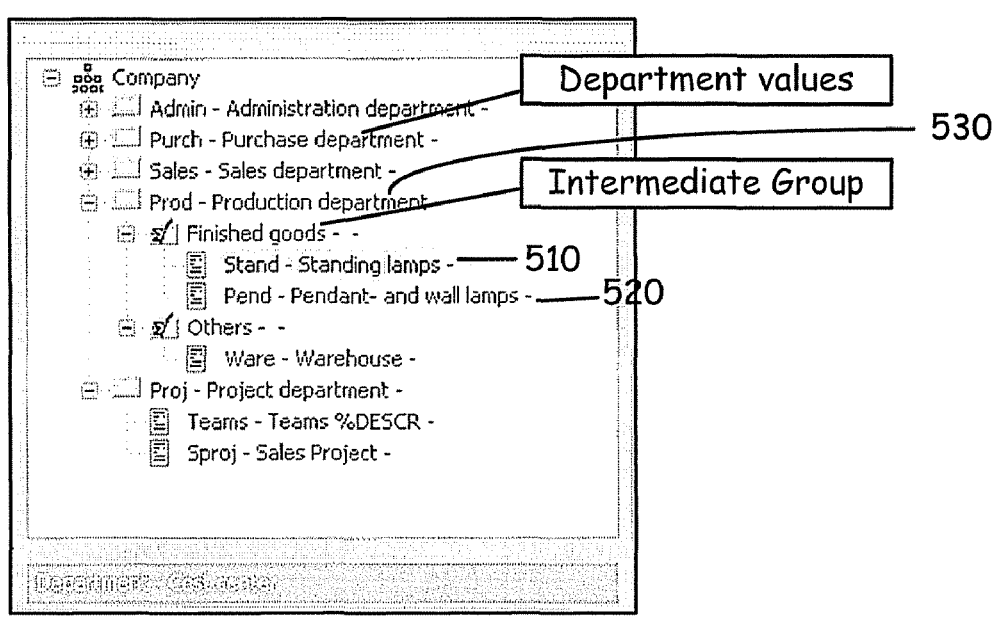
FIG. 5 is an exemplary display illustrating sublevel focus and groupings.

The user may map sub level focus components of their choosing under a branch featuring a parent focus component. For example, in FIG. 5, Stand 510 and Pend 520 cost center values are added under the branch featuring the Prod departments 530 value. Further, users may insert sub structure type rows. These refer to an existing row structure which share a portion of the focus in the same order as the current row structure focus. For example, upon building a row definition for a focus composed of ledger account department-cost center, users can insert substructures based on account-department department-cost center Account-department-cost center or any of the individual focus component (account, department, cost center). The substructure type uses the same construction rules and applies in term of precedence of the element type row discussed above.

In one illustrated embodiment each row in a branch holds formatting attribute. These attributes include classic format (bold, italic, etc.), page/line break triggers, show/hide subcomponents, and indentation. However, other attributes may be present. For example, system will roll up values bottom up. For example in FIG. 4, finished goods is the sum of the values for the ledger accounts listed below (40111, 40113, 40115).

Once the row definition has been finished the user may run a simulation and/or check on the structure developed. The simulation process can in one embodiment produce on a screen the overall detailed branches featured by the definition of the row structure. This in a sense explodes the structure in genuine values and representation. However, other methods for the simulation process can be used. The check process allows the user to identify duplicates topic values appearing more than once. Further embodiments allow the user to count the number of times a topic value is used in the process. An exception is a special type of row that can be used to print an exception report or the missing values and/or the duplicates compared to the extract list of values that are identified by the check process. The exception type row is special as it produces the exception report along the actual report using the row definition. It also identifies missing values, thus figures which have not been used for producing the report based on the row definition.

Figure 6:
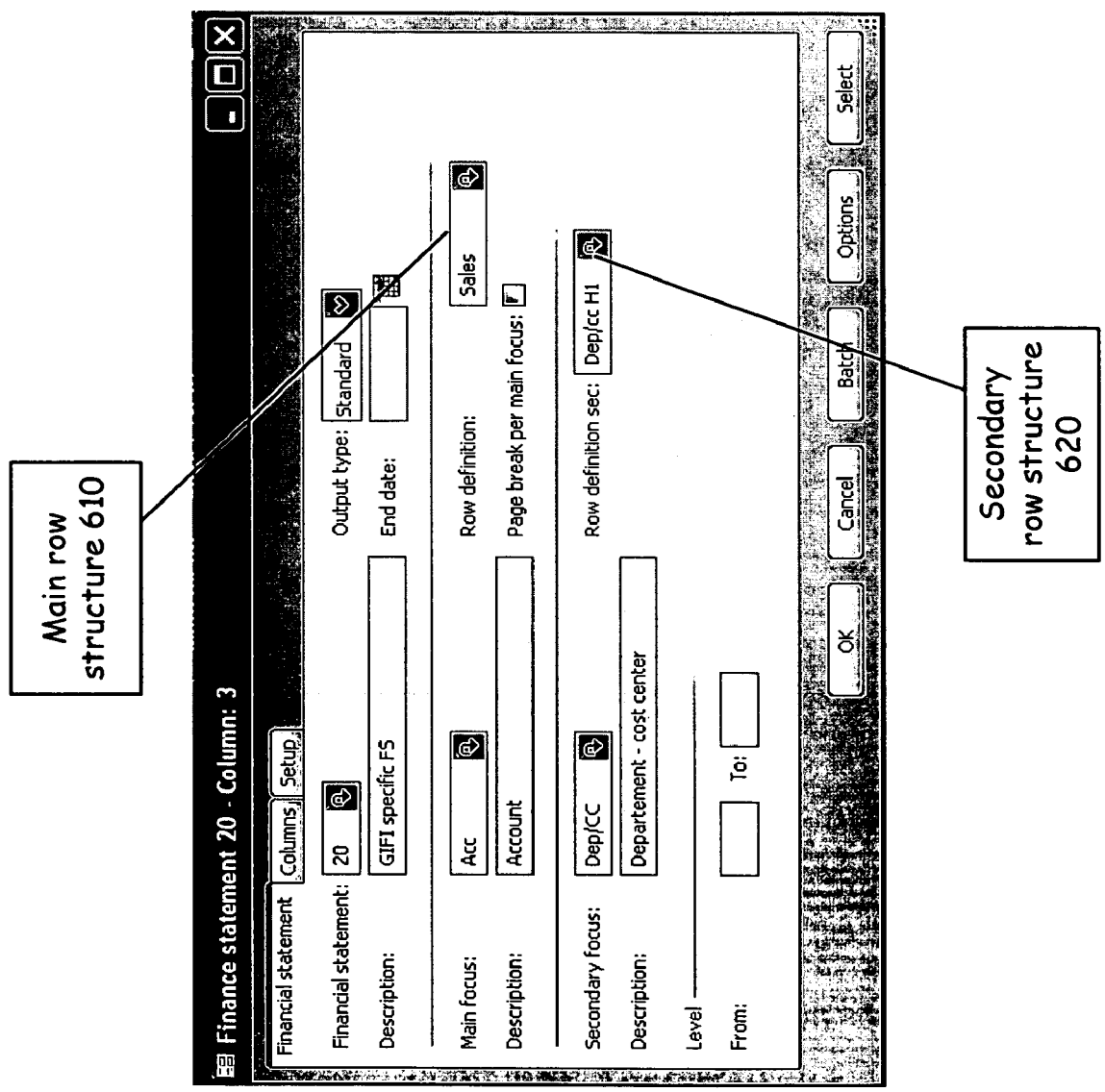
FIG. 6. is an exemplary graphical user interface for formatting the output.

Upon generating an output, the user may select a main and an optional secondary focus. This will append the topics composing the two focuses to produce the extract, and present it, exploding the composition of figures of any and all of the main focuses according secondary focus. This is illustrated at FIG. 6 at elements 610 and 620. Further, the user may format the output by considering a main and secondary row structure definition. This repeats the secondary row structure pattern at each occurrence of a main focus. Reporting allows users to hide details, print out given levels only, and hide zero rows. Further it is possible to collapse intermediate levels thus only showing distribution starting at a given level.

Figure 7:
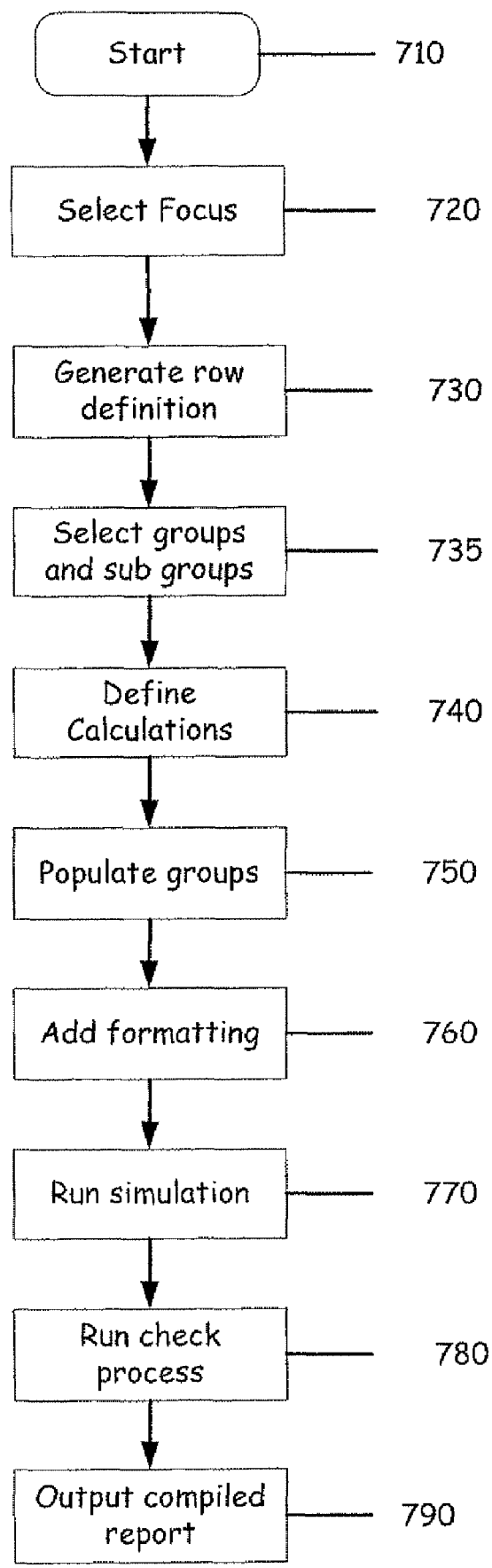
FIG. 7 is a flow diagram illustrating the steps executed by various embodiments.

FIG. 7 is a flow diagram illustrating the steps executed while defining the row definitions according to one illustrative embodiment. The processes discussed in FIG. 7 at the various elements refer to processes discussed above with regards to FIGS. 2-6. Therefore, a detailed description of these processes is not repeated here.

When a user decides to generate a report or other function they can access a screen or other graphical user interface and are presented with the ability to select a focus for the report. This is illustrated at step 710. While at this point the user can select the areas of focus. As discussed above the focus area can be a single area or can be multiple areas depending on the desires of the user or the needs of the user. The focus areas are selected at step 720.

Once the focus area has been selected the user generates the row definition for the report. These rows are based upon the information and data of the related focus areas. This is illustrated at step 730. During the row definition process the user can define a series of groups and subgroup types to add to the row definition. This is illustrated at step 735. If the report is to include calculations these can be added as well. The addition of calculations is illustrated at step 740.

Once the groups and subgroups have been defined for the row definition the user needs to populate the groups with the desired data. This is illustrated at step 750. To populate the groups and subgroups the user can use several methods. In one method the user can individually select the information types that are to be reported out. In a second method the user can define, through an expression or other method, how the group is to be populated. In one embodiment the user defines the expression based on the starting letter of the data, such as all accounts starting with the letter P. In another embodiment the user defines the expression based off of another data point in the records, such as all accounts ending in 1. However, those skilled in the art will readily recognize that there are other methods for defining the expression so that the user does not have to individually call out each data point to populate the group.

Following the populating of the groups and subgroups the user can add any formatting that is desired. The addition of formatting is illustrated at step 760. Formatting can in various embodiments include, italicizing, bolding, underlining, indenting, etc. the information in the final output. Further, at this step the user can reorder the data to be displayed. Typically, this type of situation would occur when related data falls under several groups and the user decides logically that another display organization would make the information clearer.

After the formatting step 760, the user can perform additional functions prior to generating a final report. For example the user can run a simulation on the report. A simulation allows the user to check how the information will look when displayed. The simulation is illustrated at step 770. Additionally, the user can decide to run a check process. The check process helps the user identify if data in the row definition is repeated. This check is illustrated at step 780. At this step any exceptions are also generated as output. The final output of the row definition process is then compiled or otherwise processed out to the desired output device at step 790.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for generating reports from data in an enterprise resource program, the computer-implemented method comprising:
    defining at least one focus area in the data comprising:
        displaying a list of available dimensions in the data relating to different data topics in the enterprise resource program;
        receiving user input selecting one or more of the displayed available dimensions in the data corresponding to one or more selected data topics in the enterprise resource program; and
        defining the at least one focus area as a composite of data elements based on the selected one or more of the displayed available dimensions in the data;
    after the at least one focus area has been defined, generating a multilevel row definition provided in a multilevel view within a user interface display, wherein the generating the multilevel row definition comprises:
        receiving user input that defines a user defined group within the defined at least one focus area;
        receiving user input that defines a sub-group within the user defined group, the defined sub-group comprising an intermediate level branch in the multilevel row definition; and
        receiving user input that defines an element type row comprising the intermediate level branch under the defined sub-group, the defined element type row including filter criteria for generating output values; and
    generating a report using a processor of a computer based upon the generated multilevel row definition.

2. The computer-implemented method of claim 1, wherein the generating the multilevel row definition further comprises:
    identifying at least one user defined group as a calculation group; and
    performing a desired calculation on the calculation group.

3. The computer-implemented method of claim 2, wherein the identifying the calculation group, comprises:
    identifying selected rows in the at least one user defined group as operands.

4. The computer-implemented method of claim 1, further comprising:
    performing a simulation on the generated multilevel row definition.

5. The computer-implemented method of claim 1, further comprising:
    performing a check process on the generated multilevel row definition to identify any discrepancies.

6. The computer-implemented method of claim 5, wherein the performing the check process on the generated multilevel row definition identifies any duplicate data in the generated multilevel row definition.

7. The computer-implemented method of claim 6, further comprising:
    generating an exception report for the generated multilevel row definition when the check process identifies a discrepancy.

8. The computer-implemented method of claim 1, wherein the different data topics in the enterprise resource program comprise one or more of an account type, a department, and a cost center of an organization in the enterprise resource program.

9. The computer-implemented method of claim 1, wherein the generating the multilevel row definition comprises inserting a sub structure type row that refers to an existing multilevel row definition which shares at least a portion of the at least one defined focus area with the multilevel row definition being generated.

10. The computer-implemented method of claim 1, wherein the generated multilevel row definition includes at least one calculation type row representing a user defined calculation group, the at least one calculation type row having selected rows in the generated multilevel row definition as operands to perform a desired calculation.

11. A computer system comprising:
    a processor; and
    an enterprise resource program comprising:
        a database storing data;
        a row reporting component that generates a multilevel reporting row structure using the processor, wherein the row reporting component is configured to:
            display available dimensions relating to different data topics in the enterprise resource program;
            receive user selection of one or more of the displayed available dimensions;
            define a focus area as a composite of the stored data within the database based on the selected one or more of the displayed available dimensions;
            receive user input through a user interface that defines a user defined group within the defined focus area;
            receive user input that defines a sub-group within the user defined group;
            receive user input that defines a calculation row within the defined sub-group, the defined calculation row identifying rows in the generated multilevel reporting row structure as operands to perform a desired calculation; and
            display the user defined group, the defined sub-group, and the defined calculation row in a multilevel view; and
        an output generator that generates a report comprising output data from the database based on the generated multilevel reporting row structure.

12. The computer system of claim 11, wherein the operands used to perform the desired calculation are displayed in the user interface when the defined calculation row is exploded.

13. The computer system of claim 11, wherein a check process is performed on the generated multilevel reporting row structure to identify any discrepancies in the generated multilevel reporting row structure and any duplicate data in the generated multilevel reporting row structure.

14. The computer system of claim 11, wherein the different data topics in the enterprise resource program comprise one or more of an account type, a department, and a cost center of an organization in the enterprise resource program.

15. An Enterprise Resource Planning (ERP) system comprising:
    a database storing data elements in the ERP system;
    at least one user interface comprising:
        a dimension field for displaying a list of available dimensions related to data topics in the database;
        at least one focus field, for displaying one or more focus areas; and
        at least one row definition field for displaying one or more defined multilevel row definitions; and a computer processor that:
   receives, through the at least one user interface, user input selecting a dimension from the displayed list of available dimensions;
   defines a focus area as a composite of the data elements stored in the database based on the selected dimension;
   receives, through the at least one user interface, user input defining groups and sub-groups within the defined focus area that include filter criteria for generating output values from the data elements stored in the database;
   generates a multilevel row definition based on the defined groups and the defined sub-groups;
   displays the defined focus area for selection in the at least one focus field;
   displays the generated multilevel row definition for selection in the at least one row definition field;
   receives user selection of the defined focus area displayed in the at least one focus field and user selection of the generated multilevel row definition displayed in the at least one row definition field; and
   generates a report that comprises the data elements in the database and is based on the selected defined focus area and the selected generated multilevel row definition.

16. The Enterprise Resource Planning (ERP) system of claim 15, the at least one focus field comprising:
   a main focus field receiving selection of a main focus area; and
   a secondary focus field receiving selection of a secondary focus area.

17. The Enterprise Resource Planning (ERP) system of claim 16, the at least one row definition field comprising:
   a main row definition field corresponding to the main focus field; and
   a secondary row definition field corresponding to the secondary focus field.

18. The Enterprise Resource Planning (ERP) system of claim 15, the at least one user interface comprising:
   a first user interface that:
      displays the dimension field; and
   a second user interface that:
      receives the user input defining the groups and the sub-groups within the defined focus area, wherein rows within the multilevel row definition are generated based on the defined groups and the defined sub-groups.

19. The Enterprise Resource Planning (ERP) system of claim 18, the second user interface receiving user input that:
   identifies at least one group as a calculation group; and
   performs a desired calculation on the calculation group.

20. The Enterprise Resource Planning (ERP) system of claim 18, the second user interface receiving user input that:
   defines expressions for populating the defined groups within the generated multilevel row definition with the data elements from within the defined focus area that are arranged in similar rows in the database, the expressions defining which rows of the data elements in the database are included in the defined groups and which rows of the data elements in the database are excluded from the defined groups.

* * * * *